March 11, 1958     A. BENZICK     2,826,135

SEAT CONSTRUCTION

Filed April 21, 1954     2 Sheets-Sheet 1

INVENTOR.
ALEXANDER BENZICK
BY
Carl J. Barbee

March 11, 1958  A. BENZICK  2,826,135
SEAT CONSTRUCTION

Filed April 21, 1954  2 Sheets-Sheet 2

INVENTOR.
ALEXANDER BENZICK
BY
Carl J. Barbee

United States Patent Office 2,826,135
Patented Mar. 11, 1958

2,826,135

SEAT CONSTRUCTION

Alexander Benzick, Milwaukee, Wis., assignor to American Motors Corporation, a corporation of Maryland Application April 21, 1954, Serial No. 424,623

4 Claims. (Cl. 98—2)

This invention relates to an air conditioning pad for automobiles and has as a general object to provide a pad having means for receiving air which may be expelled form said pad to cool the seat of an automotive vehicle and offer relief and comfort to an occupant of an automotive vehicle.

The primary object of this invention is to provide an air conditioning pad for automobiles, said pad, comprising upper and lower sections with a layer of burlap, or like material, disposed between said sections, the lower section having a continuous open channel formed in its upper face, the channel being arranged in a multi-rectangular pattern and the upper section also having a series of open channels arranged generally rectangularly but having the sides of each rectangle curved inwardly to criss-cross the channels of the lower section. The upper section is provided with spaced air discharge openings in the ceiling of the channels.

By arranging the channels of the upper section so that they intermittently cross over the channels of the lower section I have reduced the possibility of collapse and consequently have facilitated the flow of air through the channels to be expelled from the pad. Maximum cooling effects with the pad are obtained by installing such pad on top of the standard air foam rubber cushion of the vehicle and the usual seat coil springs whereby when weight is applied to the air conditioning pad from above, the air foam seat and coil springs serves to cushion the weight from below and helps prevent partial collapse of the channels in the sections.

I am aware of the various constructions heretofore used with respect to providing seating comfort for an occupant of an automobile with respect to providing some means for comfort between the body and seat proper. Under the circumstances it will be manifest that it is my chief aim to generally improve upon prior structure of the general type by providing an arrangement characterized by appreciable refinements and structural improvements.

The several objects, advantages and novel details of construction of the invention will be made more apparent as this description proceeds, especially when considered in connection with the accompanying drawings, wherein.

Figure 1:
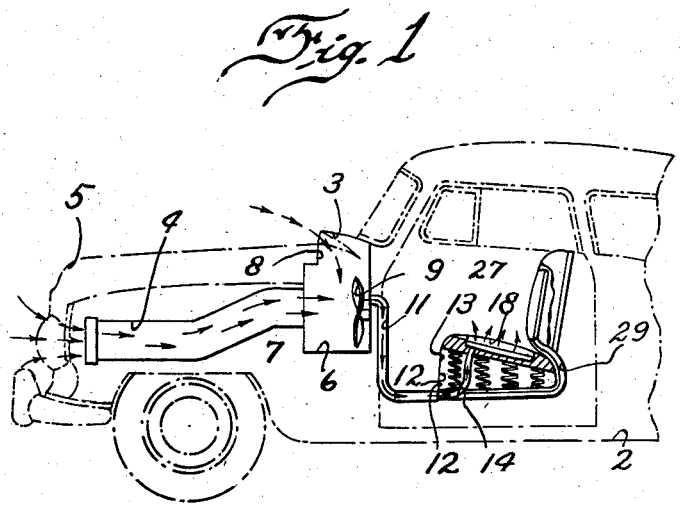
Figure 1 is a schematic view of one form of air conditioning system and a view of parts making up my invention arranged in their order of installation.
Figure 2:
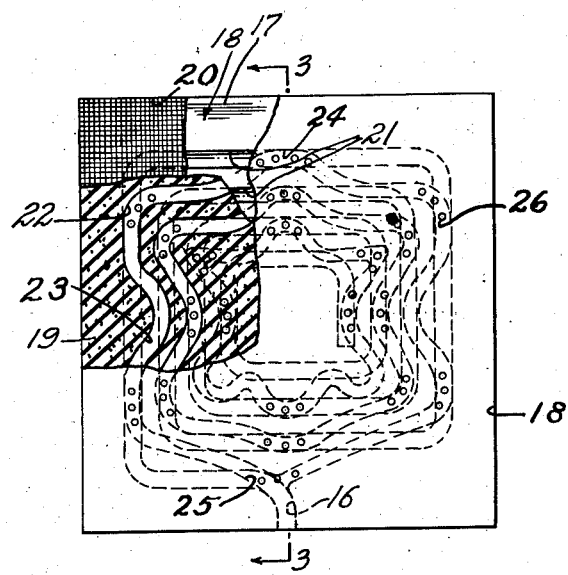
Figure 2 is a top plan view partially in cross-section of the pad making up my invention.
Figure 3:
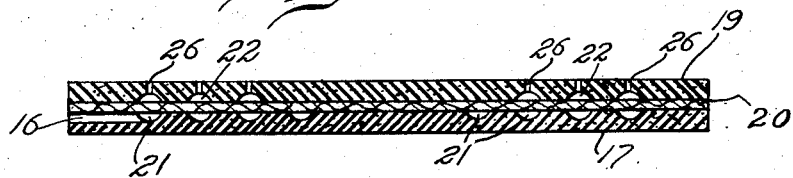
Figure 3 is a sectional view taken on the line 3—3 of Fig. 2 in cross-section of my invention.
Figure 4:
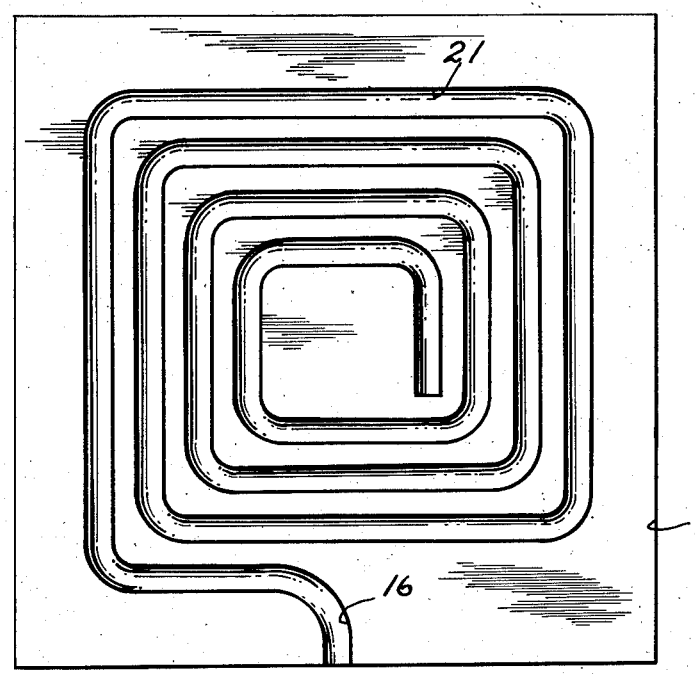
Figure 4 is a top plan view of the lower section making up the pad of my invention.

Referring now more particularly to the drawings wherein like reference characters indicate like parts, numeral 2 has reference to a vehicle body provided with a cowl 3 and an unrestricted conduit 4 open at the forward end 5 of the vehicle and terminating in a chamber 6 disposed in the engine compartment 7 of said automobile. The cowl 3 has an opening 8 which together with the opening 5 of conduit 4 provides entry for incoming outside air either by virtue of ram pressure when the automobile is moving forward or by forced convection when the fan 9 is operating.

The back wall of said chamber 6 is apertured to receive one end of a conduit 11 which may be arranged in the engine compartment and bent to be disposed underneath the floor panel, terminating at the edge 12 of the seat 13 where a reduction union or any other suitable connection is joined to the free end of said conduit to effect connection with a tube 14 of smaller diameter, the free end of which connection is joined with the channel 16 of the lower section 17 of the air conditioning pad 18.

The pad 18, which as a whole, may be made of dense sponge rubber or any other suitable material, comprises the lower section 17 and an upper section 19 separated by 40–60 mesh burlap 20 cemented between the sections 17 and 19 to provide supports for the continuous channel 21 formed in the lower section 17 and the multiple channels 22 formed in the upper section 19.

The channel 21 is in the shape of a coil with each coil formed in the shape of a rectangle diminishing in size and parallel to each other. The multiple channels 22 are concaved at the sides as indicated by numeral 23 and with the exception of the largest or outside coil are convexed at the top and bottom as indicated by the numeral 24. The bottom of the largest coil is somewhat peaked as indicated by numeral 25 to engage or be in direct communication with the channel 16.

The purpose of arranging the coils in the upper section 19 as described above is to criss-cross the channels 22 over the continuous channel 21 whereby to prevent collapse of the channels and provide space for the circulation of the air through the channels and at the same time provide a large number of areas of communication between channel 21 and the independent channels 22.

All of the channels in the upper section are apertured at strategically spaced points as indicated by the numeral 26 to permit the escape of air from the upper section and against the body of an occupant seated over the pad.

Referring to Figure 1 it is noted that the conduit may also receive a second conduit 29 which is connected to a similar air conditioning pad 27 arranged in the back of the seat. The construction of this pad 27 is identical with the pad 18 and results in air being distributed against the back of an occupant of said seat.

It is believed that the construction, manipulation, utility and advantages of this invention will now be apparent to those skilled in this art without a more detailed description thereof.

The present embodiment of the invention has been described in considerable detail merely for the purpose of exemplification since in actual practice it attains the features of the invention and the above description.

It will be apparent that changes in the details of construction, and in the combination and arrangement of parts may be resorted to without departing from the spirit and scope of the invention as hereinafter claimed or sacrificing any of its advantages.

Having thus described my invention, what I claim is:

1. An air conditioned seat cushion comprising: an upper section and a lower section arranged in face to face fashion, said sections being formed from a spongy resilient material; said lower section having a continuous channel formed in the upper face thereof and opening through one side edge thereof; said upper section having a multiplicity of channels formed in its lower face and exposed toward the channel in the lower section, said channels in the upper section being of such configuration as to intermittently cross over the path defined by the channel in the lower section whereby to define intermittent areas of communication between the channels in the sections; said upper section having discharge openings establishing communication between the channels therein and atmosphere and said sections being secured together to form a unitary cushion.

2. A seat cushion as set forth in claim 1 wherein a layer of burlap is interposed between the sections and secured thereto.

3. An air conditioning type seat cushion comprising: upper and lower sections arranged in face to face fashion and secured together to form a unitary seat cushion; each section having channels formed in those faces thereof which are exposed toward each other, the channels of one section defining paths which intermittently cross over the paths defined by the channels of the other section, whereby to form intermittent areas wherein the channels in one section are in communication with the channels in the other section, one section having an air inlet passage establishing communication between a source of air supply and the channels thereof and the other section having air discharge passages establishing communication between its channels and atmosphere and a layer of burlap interposed between the sections.

4. An air conditioning type seat cushion comprising: an upper section formed of resilient material and having a lower face with a channel formed therein; a lower section formed of resilient material and having an upper face with a channel formed therein, the upper face of the lower section being adjacent to and exposed toward the lower face of the upper section and the path defined by the channel in the upper section crossing the path defined by the channel in the lower section thereby establishing intermittent areas of communication of the channel in the upper section with the channel in the lower section and other areas wherein the channel in the upper section is not in communication with the channel in the lower section, one section having an air inlet passage establishing communication between a source of air supply and the channel thereof and the other section having air discharge passages establishing communication between its channel and atmosphere.

References Cited in the file of this patent

UNITED STATES PATENTS

| | | |
|---|---|---|
| 1,551,452 | Arias | Aug. 25, 1925 |
| 1,568,471 | Roemer | Jan. 5, 1926 |
| 2,022,959 | Gordon | Dec. 3, 1935 |
| 2,158,801 | Petterson | May 16, 1939 |